Nov. 17, 1942.        G. L. GLASENER        2,302,208
STALK CUTTER
Filed June 27, 1941        2 Sheets-Sheet 1

Inventor
George L. Glasener,
By G. C. Kennedy
Attorney

Nov. 17, 1942.  G. L. GLASENER  2,302,208
STALK CUTTER
Filed June 27, 1941  2 Sheets-Sheet 2

Inventor
George L. Glasener,
By G. C. Kennedy
Attorney

Patented Nov. 17, 1942

2,302,208

UNITED STATES PATENT OFFICE 2,302,208

STALK CUTTER

George L. Glasener, Township, Iowa

Application June 27, 1941, Serial No. 400,030

5 Claims. (Cl. 56—327)

My invention relates to improvements in stalk cutters, and particularly to asparagus cutters, and the object of my improvements is to supply a convenient device for this purpose, suitable for manual use in severing the stems of asparagus or other plants in a row or isolated, whereby the operator may perform that function with a minimum amount of bodily strain and inconvenience.

Another object of my improvements in my said device also provide coacting rockable means for operation in gathering and clasping the stems of plants at or near the ground while being severed, by using said means as mounted upon coacting upright rockable shafts, whereby the operator is relieved from stooping in cutting and gathering the stems, single or in multiple, during the operation, and also whereby the severed stem or stems are clasped together and transferred to a receptacle or pile, with a minimum of tiring labor strain.

The above objects I have attained by the means and devices which are hereinafter illustrated, and described in the following claims.

It is to be understood, however, that my invention is not restricted to the precise construction and arrangement of parts herein shown and described, nor to the various details thereof, as the same may be modified or rearranged in various particulars without departing from the spirit and scope of my invention, of which the accompanying drawings disclose its character and use.

Figure 1:
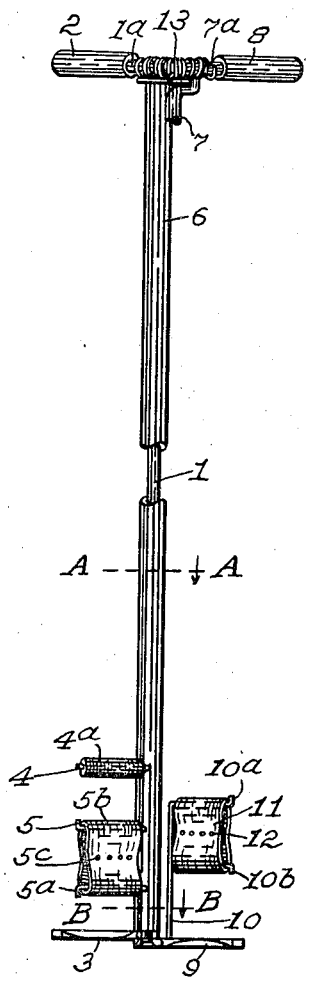
Figure 2:
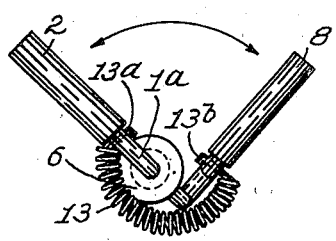
Figure 3:
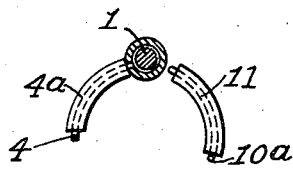
Figure 4:
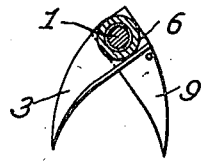
Figure 5:
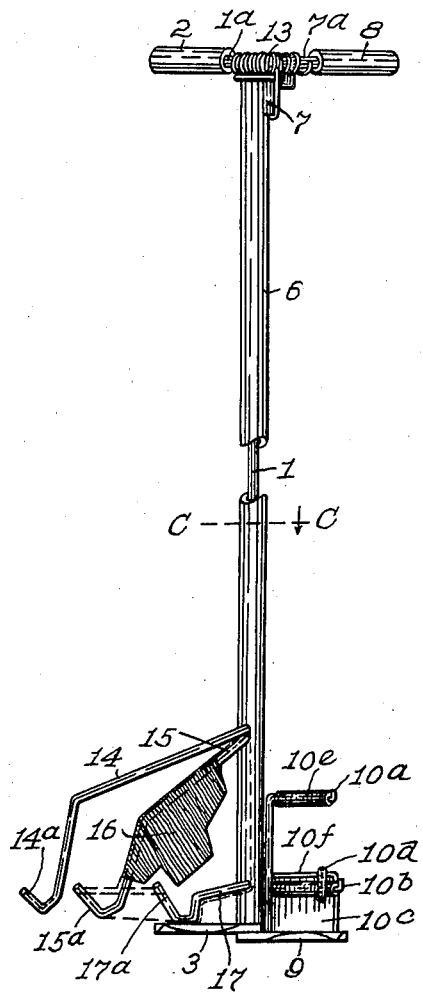
Figure 6:
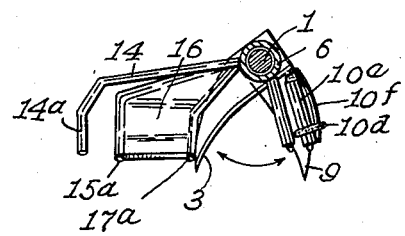

In the drawings, Fig. 1 is an elevation of one form of my invention having a portion of the rockable sleeve broken away. Fig. 2 is a top plan of the uppermost elements thereof shown on a larger scale. Fig. 3 is a cross medial section of the concentric stems shown at A—A looking downwardly and Fig. 4 is a top plan of the shearing cutters with their respective stems severed above them as shown at B—B. In Figs. 5 and 6, a modified type of the stem grasping members and devices are shown, having the same functions but with some additions in the details thereof. Similar numerals of reference denote certain features shown in Figs. 1 to 4 and in Figs. 5 and 6, and other numerals denote the equivalent but slightly varied parts of the coacting gathering arms shown in Figs. 5 and 6.

In Fig. 1, an upright stem is shown bent laterally at its upper end and provided with a cylindric cover 2. The stem 1 loosely traverses a cylindric stem part 6, with the bent member 1a above the stem 6. A lateral arm 7 is fixed on the upper part of the tubular stem 7a and bent to one side at an angle relative to the bent member 1a. The arm part 7a also traverses a like cylindric cover 8. As shown in Fig. 2, a coiled tension spring 13, bent curvately about the stems 1 and 6, has its end parts traversing holes (not shown) through the angle parts 1a and 7a with outer bent terminations 13a and 13b, securing the spring to both shaft parts 1a and 7a. As shown by the doubleheaded arrow it indicates the path of movements of the shafts 1 and 6 to and fro as controlled by said spring.

At the lower ends of the shafts 1 and 6 superpositioned like but reversed inwardly edged arcuate blades are fixed on said shafts respectively and set at a suitable angle relative to each other.

A short distance above the shear member 3 a vertically spaced pair of lateral parallel pins 5—5a are affixed to the outer shaft 6. The outer terminations of these pins are upset outwardly at 5 and 5a. An endless flexible band 5b is seated around the pins, secured at opposite sides by rivets 5c, and the band is prevented from escaping by the offset arms 5 and 5a. A vertical stem 10 has its lower end fixed to the blade 9 near and parallel with the hollow stem 6 and extends upwardly a short distance above the top level of the opposite pin 5, and this stem has an outwardly directed vertical pair of arms 10a and 10b spaced apart similarly enwrapped by a like endless band 11, with like securing medial rivets 12. A short distance above the arm 5 a curvate arm 4 projects from the shaft 6 and is covered by a sleeve 4a. This sleeved curvate arm 4—4a is a rest or fulcrum member on the hollow shaft 6 adapted to bear against a lower limb of the operator during the cutting of stems between the pair of rockable blades 3 and 9 as a fulcrum for steadiness. The operator in cutting stems near the ground stands erect without bending strains which soon incapacitate one. The cut stem parts are gathered together and held between the pads 5b and 11, and released when the arm parts 1a and 7a are rocked apart. The spring 13 when released from tension will return the cutters 3 and 9 to open positions.

Figs. 5 and 6 show some slight variations of the clasping arms on the inner and outer shafts, 1 and 6. On the blade 9 is fixed abutting the hollow shaft 6 an upright arm having a lateral part terminating in an upturned part 10a, the arm branch being covered by a cylindric cover 10e. The said upright arm has spaced below the other arm a parallel arm with like cover and having a bent end 10b, and a pad or fixed cover 10c—10f are secured by a clamp ring 10d on the part 10f.

An arm 17 has its inner end fixed on the outer shaft 6, is bent slightly downwardly outwardly and terminated by an upwardly hooked part 17a. Next above the arm 17 is a longer arm 15 sloping downwardly and having an elongated hooked part 15a, and a flexible or a stiffened web or plate 16 (shown broken away) crosses the interval of and end-fastened to said arms. Directly above the arm 15 is a third arm 14 having a like end hook 14a, sloping downwardly. These arms, all sloping downwardly in succession with their end hooks alined horizontally and spaced apart, are adapted to receive in their hooked parts severed stems to lie across their hooks and in a horizontal position, permitting the stems to be lifted for discharge therefrom when tilted and all together for placement on some supporting means, whether or not the stems are of the same or different lengths, so that the deposited stems are kept together during the operation. Fig. 6 represents the device of Fig. 5 in a top plan of said basal parts, with the web member connected between the adjacent inner arms 15 and 17. The Fig. 5 shows at C—C the cross section of the shafts 1 and 6.

I claim:

1. In a stalk cutter of the character described, in combination, a rockable shaft having its upper end bent laterally as a handle, a hollow shaft rockably mounted upon the said rockable shaft and having a fixed angular arm projecting outwardly at an angle with and in the plane of the first handle of the first shaft, a tension spring linked at its ends to the handles midway of each end thereof and positioned semicircularly around the hollow shaft, the lower ends of said inner and outer shafts having respectively thereon an overlaid pair of inwardly edged shearing cutting blades, the lower blade having a standard thereon with vertically spaced arms, and a yieldable pad positioned about said arms, a vertically spaced pair of radial arms projecting outwardly from said sleeve and spaced above the sleeve blade, a yieldable pad positioned about said arms below the level of the first-mentioned pair of arms on the inner shaft, and a third arm on the hollow shaft spaced above the pair of arms below, the blades projecting forwardly and the handles projecting rearwardly.

2. In a stalk cutter of the character described, in combination, a rockable shaft having its upper end bent laterally as a handle, a hollow shaft rockably mounted upon the said rockable shaft and having a fixed angular arm projecting outwardly and at an angle with and in the plane of the first handle of the first shaft, a tension spring linked at its ends to the handles midway of each end thereof and positioned semicircularly around the hollow shaft, the lower ends of said inner and outer shafts having respectively thereon an overlaid pair of inwardly edged shearing cutting blades, the lower blade having a standard thereon with vertically spaced arms, and a yieldable pad positioned about said arms, a vertically spaced pair of radial arms projecting outwardly from said sleeve and spaced above the sleeve blade, a yieldable pad positioned about said arms and connected thereto, and the blades projecting forwardly and the handles projecting rearwardly.

3. In a stalk cutter of the character described, in combination, a rockable shaft having its upper end bent laterally as a handle, a hollow shaft rockably mounted upon the other shaft and having an arm angularly projecting outwardly thereabove in alinement horizontally and at an angle with the handle of the other shaft, a tension spring linked at its ends to said shaft terminations and positioned semicircularly around the hollow shaft at one side, the lower ends of said inner and outer shafts having respectively an overlaid pair of inwardly edged shearing cutting blades, the lower blade having a standard thereon with outturned arm, the standard also having an outturned arm spaced beneath the first arm and also spaced above the cutting blade below, a buffer member secured on and between the second arm and the blade below, the lower part of the sleeve having along its lower part laterally positioned spaced inclined arms directed downwardly having outer terminal hooks opening upwardly, the arms varying in length increasing outwardly, an inclined web device connected between the two lowermost arms above their end hooks, and the shear blades extending forwardly with the handles projecting rearwardly.

4. In a stalk cutter of the character described, in combination, a rockable shaft having its upper end bent laterally as a handle, a hollow shaft rockably mounted upon the said rockable shaft and having a fixed angular arm projecting outwardly and a horizontal part at an angle with and in the plane of the first handle of the first shaft, a tension spring linked at its ends to the handles midway of each end thereof, and positioned semicircularly around the hollow shaft, the lower ends of said inner and outer shafts having respectively thereon an overlaid pair of inwardly edged shearing cutting blades, and outwardly directed angularly separated clasping devices respectively mounted on the rockable shaft and on the other shaft.

5. In a stalk cutter of the character described, in combination, a rockable shaft having its upper end bent laterally as a handle, a hollow shaft rockably mounted upon the said rockable shaft and having a fixed angular arm projecting outwardly and a horizontal part with and in the plane of the first handle of the first shaft, a tension spring linked at its ends to the handles midway of each end thereof and positioned semicircularly around the hollow shaft, the lower ends of the inner and outer shafts having respectively thereon an overlaid pair of inwardly edged shearing cutting blades, outwardly directed angularly separated clasping devices respectively mounted on the rockable shaft and on the other shaft, and a curvate arm projecting laterally outwardly from the hollow shaft and spaced above the clasping means therebelow.

GEORGE L. GLASENER.